(12) United States Patent
Hildebrand et al.

(10) Patent No.: US 10,949,241 B2
(45) Date of Patent: Mar. 16, 2021

(54) COST-EFFICIENT HIGH-AVAILABILITY MULTI-SINGLE-TENANT SERVICES

(71) Applicant: Google LLC, Mountain View, CA (US)

(72) Inventors: Dean Hildebrand, Bellingham, WA (US); Grigor Avagyan, Kirkland, WA (US)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 16/297,054

(22) Filed: Mar. 8, 2019

(65) Prior Publication Data
US 2020/0285502 A1    Sep. 10, 2020

(51) Int. Cl.
*G06F 9/455* (2018.01)
*G06F 9/50* (2006.01)

(52) U.S. Cl.
CPC ...... *G06F 9/45558* (2013.01); *G06F 9/45554* (2013.01); *G06F 9/5022* (2013.01); *G06F 2009/45587* (2013.01); *G06F 2209/5011* (2013.01)

(58) Field of Classification Search
CPC .......................... G06F 9/45558; G06F 9/45554
USPC ..................................... 718/1–108
See application file for complete search history.

(56) References Cited

U.S. PATENT DOCUMENTS

| 7,213,246 B1 | 5/2007 | van Rietschote et al. |
| 7,386,851 B1 * | 6/2008 | Zyuban ............. G06F 9/50 709/223 |
| 8,745,344 B2 * | 6/2014 | Kito ............... G06F 3/0689 711/162 |
| 2008/0189468 A1 * | 8/2008 | Schmidt ........... G06F 11/2046 711/6 |
| 2011/0231696 A1 | 9/2011 | Ji et al. |
| 2012/0096165 A1 | 4/2012 | Madduri et al. |
| 2017/0139749 A1 * | 5/2017 | Jamjoom ............. G06F 9/505 |

(Continued)

FOREIGN PATENT DOCUMENTS

WO    2016090292 A1    6/2016

OTHER PUBLICATIONS

Stillwell, Mark, Frederic Vivien, and Henri Casanova. "Virtual machine resource allocation for service hosting on heterogeneous distributed platforms." 2012.pp. 1-13 (Year: 2012).*

(Continued)

*Primary Examiner* — Satish Rampuria
(74) *Attorney, Agent, or Firm* — Lerner, David, Littenberg, Krumholz & Mentlik, LLP (57) ABSTRACT

A secondary pool of VMs is used to run secondary services or jobs, which may be evicted upon failure of a corresponding primary VM. Upon detection of a failure of a primary resource, the secondary services or jobs are evicted from secondary pool resources, and the secondary pool resources can be automatically allocated to the jobs of the failed primary resource. In this regard, a secondary job may be thought of as a preemptible job and comprises services or jobs that are lower priority than the service or job on the primary resource. By using computing resources in the secondary pool to run secondary or preemptible jobs, this technology makes use of what would be otherwise idle resources. This beneficially avoids having to allocate additional and separate computing resources for secondary jobs, leads to more efficient use of network resources, and reduces costs.

18 Claims, 6 Drawing Sheets

(56) References Cited

U.S. PATENT DOCUMENTS

2018/0165166 A1 6/2018 Wang et al.
2018/0210791 A1* 7/2018 Helleren ............. G06F 11/1441

OTHER PUBLICATIONS

Kapil, Divya, Emmanuel S. Pilli, and Ramesh C. Joshi. "Live virtual machine migration techniques: Survey and research challenges." 2013 3rd IEEE International Advance Computing Conference (IACC). IEEE, 2013.pp. 963-969 (Year: 2013).*

Vaghani, Satyam B. "Virtual machine file system." ACM SIGOPS Operating Systems Review 44.4 (2010): pp. 57-70. (Year: 2010).*

Bezemer, Cor-Paul, and Andy Zaidman. "Multi-tenant SaaS applications: maintenance dream or nightmare?." Proceedings of the Joint ERCIM Workshop on Software Evolution (EVOL) and International Workshop on Principles of Software Evolution (IWPSE). 2010.pp. 88-92 (Year: 2010).*

Slominski, Aleksander, Vinod Muthusamy, and Rania Khalaf. "Building a multi-tenant cloud service from legacy code with docker containers." 2015 IEEE International Conference on Cloud Engineering. IEEE, 2015.pp. 394-396 (Year: 2015).*

Guo, Chang Jie, et al. "A framework for native multi-tenancy application development and management." The 9th IEEE International Conference on E-Commerce Technology and The 4th IEEE International Conference on Enterprise Computing, E-Commerce and E-Services (CEC-EEE 2007). IEEE, 2007.pp. 1-8 (Year: 2007).*

Yanyan Hu et al: "Virtual Machine Based Hot-Spare Fault-Tolerant System", 2009 1st International Conference on Information Science and Engineering (ICISE 2009)—Dec. 26-28, 2009—Nanjing, China, IEEE, Piscataway, NJ, USA, Dec. 26, 2009 (Dec. 26, 2009), pp. 429-432, XP831662888, ISBN: 978-1-4244-4989-5.

International Search Report and Written Opinion for International Application No. PCT/US2019/062789 dated Feb. 7, 2020. 15 pages.

* cited by examiner

COST-EFFICIENT HIGH-AVAILABILITY MULTI-SINGLE-TENANT SERVICES

BACKGROUND

Multi-single-tenant (MST) services run individual service instances in an isolated environment, such as in a separate virtual machine (VM). Cloud SQL is an example of such a service. Since individual service instances run on a single VM, the failure of the VM will result in unavailability of the service instance. Failures may be planned or unplanned, but either requires the VM to be taken down. An example of a planned failure is VM updates, such as critical security patches to the kernel. A control plane of the service may be able to detect VM failures, and failover to a newly created VM. For planned failovers, the unavailability time for the VM may be reduced by re-creating the new VM before taking down the old one. However, both approaches are prone to VM stockouts, where users are unable to create VMs due to lack of capacity of the requested type of machine in the target zone. This is unacceptable as it renders customer's existing service instances unavailable for an indefinite period of time.

BRIEF SUMMARY

Some MST services, such as Cloud SQL, provide High Availability (HA) solutions where a hot-standby secondary VM is kept around next to a primary VM all the time to avoid stockouts in case the primary fails, and to be able to do a quick failover in case the primary VM fails or it needs to be updated. Primary and secondary VMs are typically put behind a load balancer endpoint so that the IP address of the instance remains stable throughout failovers. For services that require this active-passive model, the secondary VM is used exclusively during the failover and sits idle otherwise. This is expensive, as it doubles the compute resources associated with a single instance of the service and can increase the service cost as much as nearly double. For this added cost, the secondary VM is typically only used approximately once every 1-2 years for unplanned failures and once every quarter for planned updates.

The present disclosure provides a solution which reduces the cost of maintaining a standby VM in an HA solution without sacrificing availability characteristics, such as uptime, failover time, etc. The secondary pool of VMs, or more generally computing resources, is used to run secondary services or jobs. Upon detection of a failure of a given VM, the secondary services or jobs are evicted from secondary pool resources, so that those secondary pool resources can be automatically allocated to a primary job or service on the failed VM. In this regard, a secondary job may be thought of as a preemptible job and comprises services or jobs that are deserving of a lower priority than the failed service or job. By using computing resources in the secondary pool to run secondary or preemptible jobs, this technology makes use of what would be otherwise idle resources. This beneficially avoids having to allocate additional and separate computing resources for secondary jobs. This leads to more efficient use of network resources and potentially mitigates having to otherwise grow potentially under-utilized networks, which results in reductions in high availability ("HA") costs.

One aspect of the disclosure provides a method for managing pooled computing resources used for providing services in a distributed system. The method includes determining, by data processing hardware of the distributed system, a primary pool of computing resources designated for running one or more primary jobs, determining, by the data processing hardware of the distributed system, a secondary pool of computing resources designated for running one or more secondary jobs different than the one or more primary jobs, preempting a given one of the one or more secondary jobs using computing resources from the secondary pool upon detection of a failure condition associated with a given one of the one or more primary jobs running using computing resources from the primary pool, and allocating the secondary computing resources from the given secondary job to the given primary job associated with the failure condition.

Another aspect of the disclosure provides a system for managing pooled computing resources used for providing services in a distributed system. The system includes a primary pool of computing resources designated for running one or more primary jobs, a secondary pool of computing resources designated for running one or more secondary jobs different than the one or more primary jobs, and one or more processors. The one or more processors are configured to detect a failure condition associated with a given one of the one or more primary jobs running using computing resources from the primary pool, preempt a given one of the one or more secondary jobs using computing resources from the secondary pool upon detection of the failure condition, and allocate the secondary computing resources from the given secondary job to the given primary job associated with the failure condition. The failure condition may be, for example, a planned system update, an unexpected failure, or another event resulting in the unavailability of the computing resource.

A non-transitory computer-readable medium storing instructions executable by one or more processors for performing a method of managing pooled computing resources used for providing services in a distributed system, the method including determining a primary pool of computing resources designated for running one or more primary jobs, determining a secondary pool of computing resources designated for running one or more secondary jobs different than the one or more primary jobs, preempting a given one of the one or more secondary jobs using computing resources from the secondary pool upon detection of a failure condition associated with a given one of the one or more primary jobs running using computing resources from the primary pool, and allocating the secondary computing resources from the given secondary job to the given primary job associated with the failure condition.

DETAILED DESCRIPTION

Overview

A secondary pool of VMs is used to run secondary services or jobs, which may be evicted upon failure of a corresponding primary VM. For example, upon detection of a failure of a primary resource, the secondary services or jobs are evicted from secondary pool resources, and the secondary pool resources can be automatically allocated to the jobs of the failed primary resource. In this regard, a secondary job may be thought of as a preemptible job and comprises services or jobs that are lower priority than the service or job on the primary resource. By using computing resources in the secondary pool to run secondary or preemptible jobs, this technology makes use of what would be otherwise idle resources. This beneficially avoids having to allocate additional and separate computing resources for secondary jobs. This leads to more efficient use of network resources and potentially mitigates having to otherwise grow potentially under-utilized networks, thereby reducing HA costs.

A sub-aspect of this technology comprises gracefully dialing down and transferring computing resources from a secondary job to the failed or failing job in response to detecting a failover condition. For example, if a preemptible or secondary job is running in a container (e.g., docker, lxc, etc.) using resources in a secondary pool, those resources can be dynamically shifted from the secondary job to the primary or main job. Dynamic shifting or allocation of resources comprises gradually reducing the resources (e.g., CPU, memory, networking, etc.) being used by the secondary job and in concert with that reduction allocate the freed-up or now unused resources to the primary job. The freed-up resources may then run the primary job on the VM, by way of example only, in another docker container. The primary job may fail over to a different VM, given that the VM it was running on was the source of the failure. The different VM is allocated from the secondary VM pool. Where the resource that is being dynamically allocated comprises a CPU, either the number of CPUs or performance of each CPU being used may be throttled to achieve a desired result. The dialing down and reallocation of computing resources may impact the performance of the secondary job, but at least provides an opportunity for it to gracefully shut down, while at the same time avoid significantly impacting the performance of the primary job.

The dialing down and reallocation of computing resources may be set to occur during a pre-determined period, e.g., a so called "grace period." During this period, as the computing resources used by the secondary jobs are dialed down, they are allocated for use by the primary job. Once the grace period ends, the secondary job is terminated, e.g., the secondary job's container is torn down. During the grace period, the redistribution of computing resources between the secondary job and the primary job in effect comprises an inversely proportional relationship. That is, while computing resources used for a secondary job are dialed or ramped down, the primary job can begin with the resources made available to it and the resources made available to the primary job can be increased as they are freed up by the completion of the secondary job.

There may be cases where the primary job could be started at the time the VM is created and use whatever resources are available at that time (e.g., a single virtual CPU ("vCPU")) and then those resources could be increased during the grace period at failover time. As an example, various primary jobs may be run on secondary VMs in what may be referred to as idle mode, where they don't serve traffic. A modest amount of resources, such as CPU, memory, network, will be allocated for these jobs as most of the resources will typically be allocated for the secondary jobs. In this example, when a VM running a primary job X fails, that primary job can quickly failover to secondary VM and the primary job X would have already been running on the secondary VM and it therefore only needs to be allocated more resources.

As another example, this technology may also be applied in a "bare metal" environment, in which a server acts as single tenant physical server. More generally, "bare metal" relates to the removal of the virtualization technology or any form for containerization from the host. For example, if a job was running on a VM as described above, it would now run on an entire physical machine, and failures that take down the machine would be handled similarly to how failures are handled with respect to a VM. In such an environment, a slot of resources can be reserved on a particular bare metal host. A secondary job can be run in a container created on that slot. In the bare-metal example, applications do not run in VMs, but rather on the physical machine's operating system (OS). So while the secondary jobs are in VMs or containers, the primary workload is running directly on the machine's OS. Therefore, this disclosure also applies to clusters that aren't using a virtualization layer.

In another aspect of this technology, the failover or secondary VM pool may be sized to accommodate worst case failure scenarios. For example, a predetermined portion of the failover or secondary VM pool may be set aside for running secondary or pre-emptive jobs such that failovers that may occur are not impacted. In this regard, a threshold can be identified that indicates the number of failover VMs that must remain free and available for failovers. The threshold may be based on the run time for preemptible or secondary jobs and a typical number of failovers that may occur. As a particular example, if a preemptible job has a minimum and a maximum run time (e.g., must run for at least 10 minutes and no more than 24 hours), then predictions can be made of the maximum number of preemptible jobs that can be executed without impacting a typical number of failovers that need to occur. As such, preemptible job requests may be satisfied and continue to launch until the maximum threshold for computing resources is consumed and no, or insufficient, computing resources set aside for preemptive jobs are available. At this point, no failover jobs will be launched in the secondary or preemptive pool. In addition, if the number of failovers becomes large enough so that additional failover or secondary pool computing resources are needed, then some portion of the preemptible jobs within the thresholded section of the pool may then be evicted to free up resources to accommodate additional failover requests. In this way, the available thresholded resources will be reduced to some level below the threshold limit.

As an option, preemptible or secondary jobs may be spread across available VMs evenly or may be distributed in series across the available VMs so as to fully consume the resources of given VM before using another VM.

Example Systems

Figure 1:
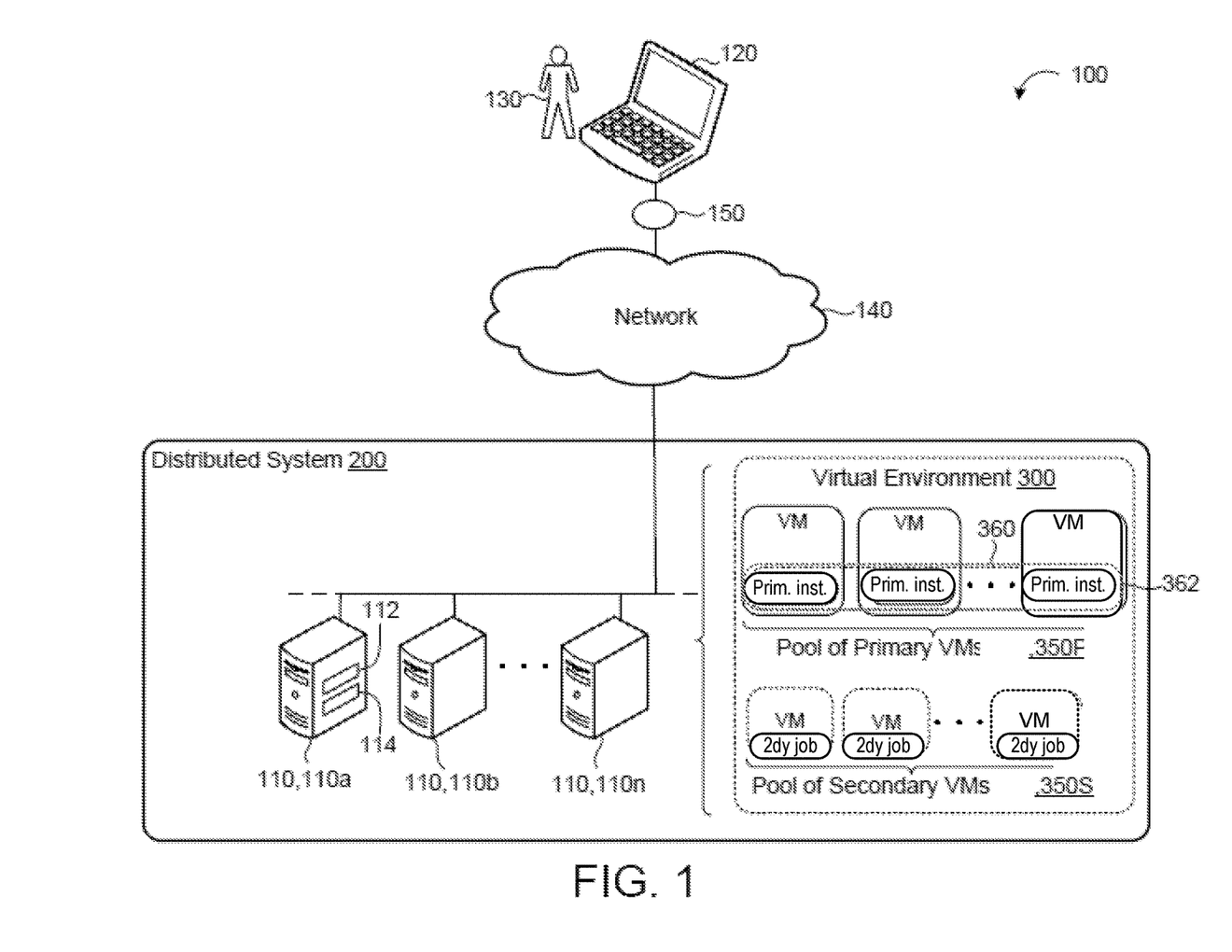
FIG. 1 is a schematic view of an example system including a user device in communication with a distributed system over a network according to aspects of the disclosure.

FIG. 1 illustrates an example system 100, including a distributed system 200 configured to run a service 360, such as a software application, in a virtual computing environment 300 executing on a pool of primary VM instances 350P. A user device 120, such as a computer, associated with a user 130, such as a customer, communicates via a network 140 with the distributed system 200 to provide commands 150 for deploying, removing, or modifying primary VM instances 350P running in the virtual computing environment 300. The number of primary VM instances 350P in the pool of primary VM instances 350P may dynamically change based on commands 150 received from the user device 120. In some examples, the software application 360 is associated with a MST service and each primary VM instance 350P is configured to execute a corresponding individual service instance 362 (e.g., a single tenant of the MST service) of the software application 360.

The virtual environment 300 further includes a pool of secondary VM instances 350S running secondary jobs. For example, the secondary jobs may be of lower priority than the service 360 running on the primary VM instances 350P, such that disruptions to the secondary jobs are less problematic than disruptions to the primary instances. As discussed further below in connection with FIG. 2, in the event that one or more primary VM instances 350P become unavailable, the distributed system 200 executes a computing device 112 configured to identify one or more of the secondary VM instances 350S to run failed over jobs from the unavailable VM instance.

In some examples, the pool of primary VM instances 350P is associated with a single user/customer 130 and the pool of secondary VM instances 350S are also for use by the single user/customer 130. In other examples, the pool of primary VM instances 350P includes multiple sub-pools of primary VM instances 350P with each sub-pool associated with a different user/customer 130 and isolated from the other sub-pools. In these examples, the pool of secondary VM instances 350S is shared among the multiple different user/customers 130 in events that one or more primary VM instances 350P in any of the sub-pools are unavailable.

In some implementations, the virtual computing environment 300 is overlaid on resources 110, 110a-n of the distributed system 200. The resources 110 may include hardware resources 110 and software resources 110. The hardware resources 110 may include computing devices 112 (also referred to as data processing devices and data processing hardware) or non-transitory memory 114 (also referred to as memory hardware). The software resources 110 may include software applications, software services, application programming interfaces (APIs) or the like. The software resources 110 may reside in the hardware resources 110. For example, the software resources 110 may be stored in the memory hardware 114 or the hardware resources 110 (e.g., the computing devices 112) may be executing the software resources 110.

The network 140 may include various types of networks, such as local area network (LAN), wide area network (WAN), and/or the Internet. Although the network 140 may represent a long range network (e.g., Internet or WAN), in some implementations, the network 140 includes a shorter range network, such as a local area network (LAN). In some implementations, the network 140 uses standard communications technologies and/or protocols. Thus, the network 140 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 132 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 140 uses custom and/or dedicated data communications technologies instead of, or in addition to, the ones described above.

Figure 2:
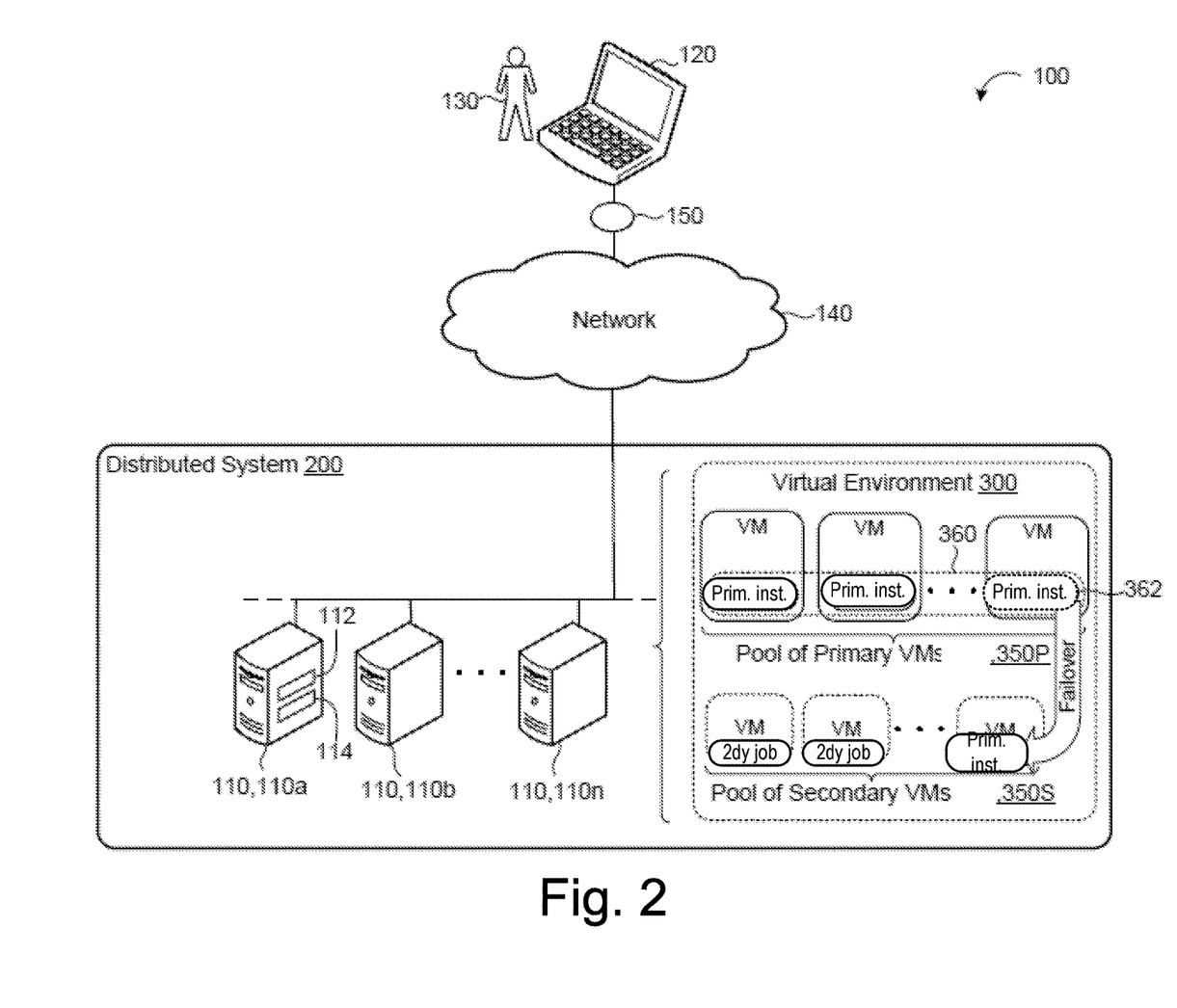
FIG. 2 illustrates an example of the system of FIG. 1 during a failover according to aspects of the disclosure.

As shown in FIG. 2, A primary VM instance 350P may become unavailable as a result of an unplanned and unexpected failure, a delay in re-creating the primary VM instance 350P, and/or as a result of a planned maintenance time period for the primary VM instance 350P, such as updates for critical security patches to a kernel of the primary VM instance 350P. When unavailability of one or more primary VM instances 350P is planned or detected, such as during updating or during a failure, the primary instance may automatically fail over to one or more of the secondary VMs 350S. For example, the distributed system 200 executes a computing device 112 configured to identify one or more of the secondary VM instances 350S to run jobs from the unavailable VM instance. In this regard, the distributed system maintains availability of the one or more individual service instances 362 associated with the unavailable primary VM instances 350P. Because the identified one or more secondary VMs are already running secondary jobs, those jobs may be dialed down and removed in order to free up resources for the jobs from the failed primary VM instance. For example, the secondary services or jobs are evicted from secondary pool resources, and the secondary pool resources can be automatically allocated to the jobs of the failed primary resource. In this regard, a secondary job may be thought of as a preemptible job and comprises services or jobs that are lower priority than the service or job on the primary resource. By using computing resources in the secondary pool to run secondary or preemptible jobs, this technology makes use of what would be otherwise idle resources. This beneficially avoids having to allocate additional and separate computing resources for secondary jobs. This leads to more efficient use of network resources and potentially mitigates having to otherwise grow potentially under-utilized networks, thereby reducing HA costs.

While disclosure above refers to resources as VM instances, it should be understood that other types of resources may be used, such as containers, server slots in a bare metal environment, etc. For example, the arrangement of secondary jobs running on secondary resources may be applied in a "bare metal" environment, in which a server acts as single tenant physical server. More generally, "bare metal" relates to removal virtualization technology or any form for containerization from the host. For example, a job may be run on an entire physical machine, and failures that take down the machine would be handled similarly to how failures are handled with respect to a VM. In such an environment, a slot of resources can be reserved on a particular bare metal host. A secondary job can be run in a container created on that slot. In the bare-metal example, applications do not run in VMs, but rather on the physical machine's operating system (OS). So while the secondary jobs are in VMs or containers, the primary workload is running directly on the machine's OS. Therefore, this disclosure also applies to clusters that aren't using a virtualization layer.

Figure 3:
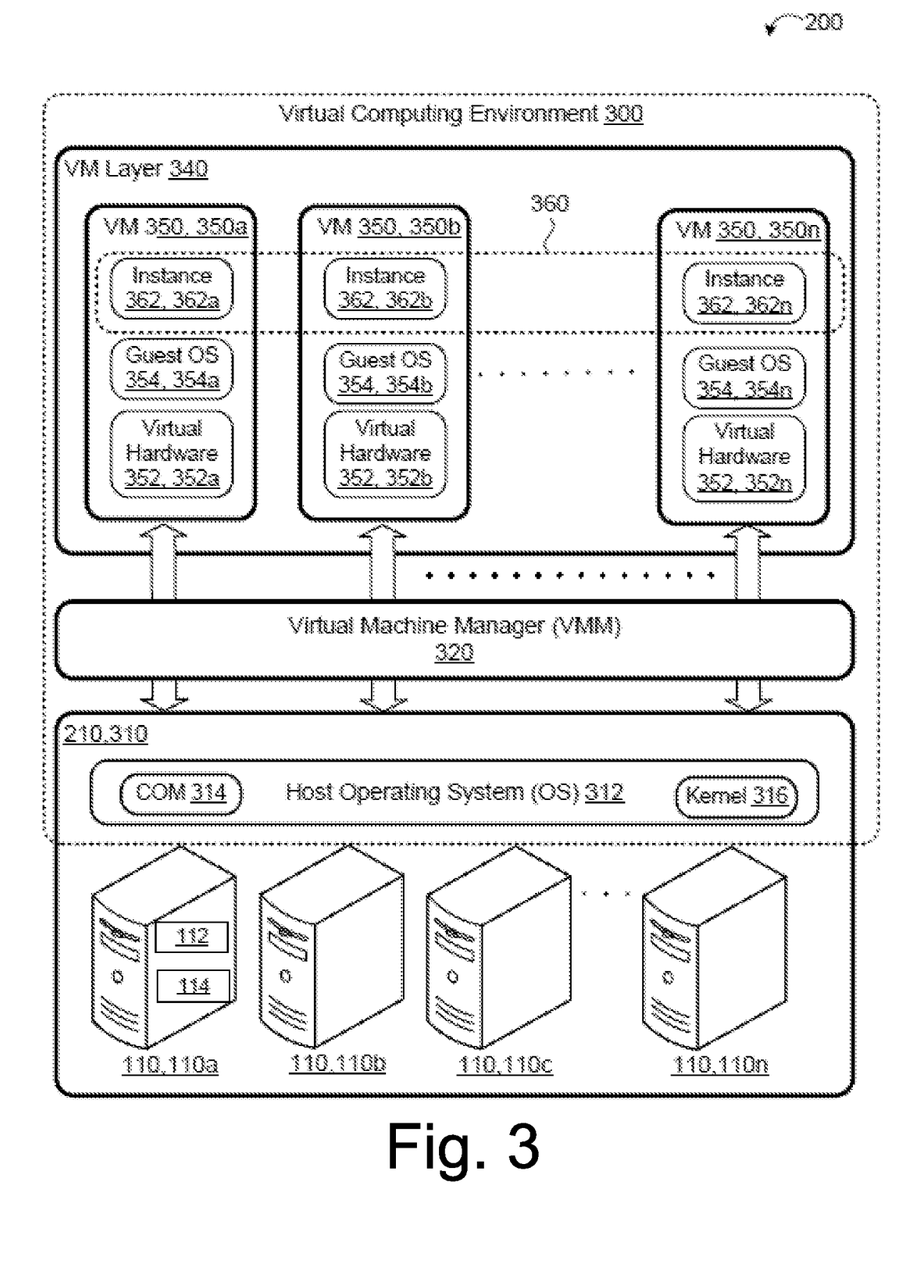
FIG. 3 is a schematic view of an example distributed system executing a virtual computing environment according to aspects of the disclosure.

In the example shown in FIG. 3, the distributed system 200 includes a collection 210 of resources 110 (e.g., hardware resources 110) executing the virtual computing environment 300. The virtual computing environment 300 includes a virtual machine manager (VMM) 320 and a virtual machine (VM) layer 340 running one or more virtual machines (VMs) 350, 350a-n configured to execute instances 362a, 362a-n of one or more software applications 360. Each hardware resource 110 may include one or more physical central processing units (pCPU) 112 ("data processing hardware 112") and memory hardware 114. While each hardware resource 110 is shown having a single physical processor 112, any hardware resource 110 may include multiple physical processors 112. A host operating system (OS) 312 may execute on the collection 220 of resources 110.

In some examples, the VMM 320 corresponds to a hypervisor 320 (e.g., a Compute Engine) that includes at least one of software, firmware, or hardware configured to create, instantiate/deploy, and execute the VMs 350. A computer, such as data processing hardware 112, associated with the VMM 320 that executes the one or more VMs 350 may be referred to as a host machine 310, while each VM 350 may be referred to as a guest machine. Here, the VMM 320 or hypervisor is configured to provide each VM 350 a corresponding guest operating system (OS) 354, 354a-n having a virtual operating platform and manage execution of the corresponding guest OS 354 on the VM 350. As used herein, each VM 350 may be referred to as an "instance" or a "VM instance". In some examples, multiple instances of a variety of operating systems may share virtualized resources. For instance, a first VM 350 of the Linux® operating system, a second VM 350 of the Windows® operating system, and a third VM 350 of the OS X® operating system may all run on a single physical x86 machine.

The VM layer 340 includes one or more virtual machines 350. The distributed system 200 enables the user 130 to launch VMs 350 on demand, i.e., by sending a command 150 (FIG. 1) to the distributed system 200 via the network 140. For instance, the command 150 may include an image or snapshot associated with the corresponding operating system 312 and the distributed system 200 may use the image or snapshot to create a root resource 110 for the corresponding VM 350. Here, the image or snapshot within the command 150 may include a boot loader, the corresponding operating system 312, and a root file system. In response to receiving the command 150, the distributed system 200 may instantiate the corresponding VM 350 and automatically start the VM 350 upon instantiation. A VM 350 emulates a real computer system (e.g., host machine 310) and operates based on the computer architecture and functions of the real computer system or a hypothetical computer system, which may involve specialized hardware, software, or a combination thereof. In some examples, the distributed system 200 authorizes and authenticates the user 130 before launching the one or more VMs 350. An instance 362 of a software application 360, or simply an instance, refers to a VM 350 hosted on (executing on) the data processing hardware 112 of the distributed system 200.

The host OS 312 virtualizes underlying host machine hardware and manages concurrent execution of one or more VM instances 350. For instance, host OS 312 may manage VM instances 350a-n and each VM instance 350 may include a simulated version of the underlying host machine hardware, or a different computer architecture. The simulated version of the hardware associated with each VM instance 350, 350a-n is referred to as virtual hardware 352, 352a-n. The virtual hardware 352 may include one or more virtual central processing units (vCPUs) ("virtual processor") emulating one or more physical processors 112 of a host machine 310 (FIG. 3). The virtual processor may be interchangeably referred to a "computing resource" associated with the VM instance 350. The computing resource may include a target computing resource level required for executing the corresponding individual service instance 362.

The virtual hardware 352 may further include virtual memory in communication with the virtual processor and storing guest instructions (e.g., guest software) executable by the virtual processor for performing operations. For instance, the virtual processor may execute instructions from the virtual memory that cause the virtual processor to execute a corresponding individual service instance 362 of the software application 360. Here, the individual service instance 362 may be referred to as a guest instance that cannot determine if it is being executed by the virtual hardware 352 or the physical data processing hardware 112. If a guest service instance 362 executing on a corresponding VM instance 350, or the VM instance 350 itself, malfunctions or aborts, other VM instances executing corresponding individual service instances 362 will not be affected. A host machine's microprocessor(s) can include processor-level mechanisms to enable virtual hardware 352 to execute software instances 362 of applications 360 efficiently by allowing guest software instructions to be executed directly on the host machine's microprocessor without requiring code-rewriting, recompilation, or instruction emulation. The virtual memory may be interchangeably referred to as a "memory resource" associated with the VM instance 350. The memory resource may include a target memory resource level required for executing the corresponding individual service instance 362.

The virtual hardware 352 may further include at least one virtual storage device that provides storage capacity for the service on the physical memory hardware 114. The at least one virtual storage device may be referred to as a storage resource associated with the VM instance 350. The storage resource may include a target storage resource level required for executing the corresponding individual service instance 362. The guest software executing on each VM instance 350 may further assign network boundaries (e.g., allocate network addresses) through which respective guest software can communicate with other processes reachable through an internal network 330 (FIG. 3), the external network 140 (FIG. 1), or both. The network boundaries may be referred to as a network resource associated with the VM instance 350.

The guest OS 354 executing on each VM 350 includes software that controls the execution of the corresponding individual service instance 362, 362a-n of the application 360 by the VM instance 350. The guest OS 354, 354a-n executing on a VM instance 350, 350a-n can be the same or different as the other guest OS 354 executing on the other VM instances 350. In some implementations, a VM instance 350 does not require a guest OS 354 in order to execute the individual service instance 362. The host OS 312 may further include virtual memory reserved for a kernel 316 of the host OS 312. The kernel 316 may include kernel extensions and device drivers, and may perform certain privileged operations that are off limits to processes running in a user process space of the host OS 312. Examples of privileged operations include access to different address spaces, access to special functional processor units in the host machine 310 such as memory management units, and so on. A communication process 314 running on the host OS 312 may provide a portion of VM network communication functionality and may execute in the user process space or a kernel process space associated with the kernel 316.

Figure 4:
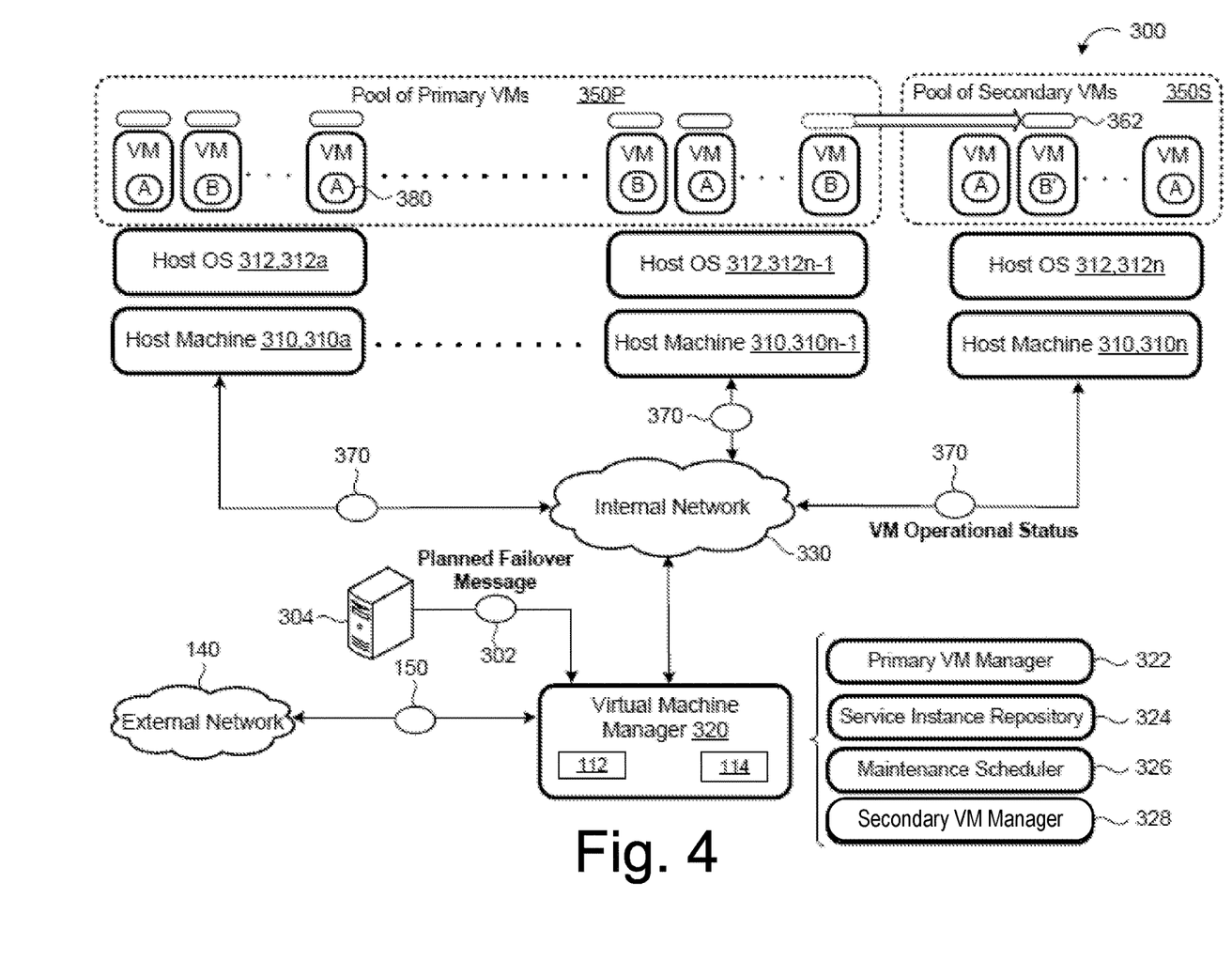
FIG. 4 is a schematic view of an example virtual computing environment having a pool of primary virtual machines and a pool of secondary virtual machines according to aspects of the disclosure.

Referring to FIG. 4, in some implementations, a virtual computing environment 300 running on the distributed system 200 includes multiple host machines 310, 310a-n (e.g., one or more data processing apparatus such as rack mounted servers or different computing devices) that may be located in different physical locations and can have different capabilities and computer architectures. The host machines 310 may communicate with each other through an internal data communications network 330 (internal network). The internal network 330 can include one or more wired (e.g., Ethernet) or wireless (e.g., Wi-Fi) networks, for example. In some implementations, the internal network 330 is an intranet. Optionally, the host machines 310 may also communicate with devices on the external network 140, such as the Internet. Other types of external networks are possible.

In the example shown, each host machine 310 executes a corresponding host operating system (OS) 312, 312a-n that virtualizes the underlying hardware (i.e., data processing hardware 112 and memory hardware 114) of the host machine 310 and manages concurrent execution of multiple VM instances 350. For instance, host operating systems 312a-312n-1 each manage concurrent execution of multiple primary VM instances 350P to collectively provide the pool of primary VMs 350P, while host operating system 312n executing on host machine 310n manages execution of the pool of secondary VM instances 350S. Here, a dedicated host machine (e.g., host machine 310n) hosts the entire pool of secondary VM instances 350S, thereby ensuring that sufficient resources are available for use by the secondary VM instances 350S in the event of a failover (without requiring the failover secondary VM instances 350S to migrate to a different host machine 310 with sufficient resources). In other examples, however, one or more of the secondary VM instances 350S may be instantiated across multiple host machines 310 that may also be executing one or more primary VM instances 350P.

In some implementations, the virtual machine manager 320 uses a primary VM manager 322 to create and deploy each primary VM instance 350P in the pool of primary VM instances 350 for execution on a designated host machine 310. The VMM 320 may create each primary VM instance 350 by allocating computing resource levels, memory resource levels, network specifications, and/or storage resource levels required for executing the corresponding individual service instance 362. Thus, each primary VM instance 350P in the pool of primary VM instances 350P may include a corresponding VM type 380 that indicates at least one of memory resource requirements, computing resource requirements, network specification requirements, or storage resource requirements for the corresponding primary VM instance 350. In the example shown, all the primary VM instances 350P in the pool of primary VM instances 350P have VM type 380 of Type A or of Type B. Thus, a VM type 380 of Type A may include at least one of computing resource levels, memory resource levels, a network specification, or storage resource levels that are different than a VM type 380 of Type B.

The primary VM manager 322 at the VMM 320 may maintain an active log of each VM instance 350P deployed into the pool of primary VM instances 350P, the VM type 380 of each VM instance 350P, and the corresponding individual service instance 362 executing on each primary VM instance 350P. The log may be updated as primary VM instances 350P are deployed into, or removed from, the pool of primary VM instances 350P. Additionally, the pool of primary VM instances 350P may be further divided into sub-pools based on a distribution of the primary VM instances 350P in various fault domains, such as building, zone, or region. In some implementations, the individual service instances 362 each execute in a corresponding container that runs on a single primary VM instance 350P with multiple other containers. Accordingly, the log may indicate a list of containers running on each primary VM instance 350P, as well as the corresponding service instance 362 executing in each container.

The primary VM manager 322 further obtains the rate of unavailability for each primary VM instance 350P. For example, each primary VM instance 350P may include a corresponding mean-time-to-failure (MTTF) indicating how long (e.g., a number of days) the primary VM instance 350P is expected to be operational before incurring a failure. The MTTF value could be 365 days (e.g., 1 year) or 720 days (e.g., 2 years). The rate of unavailability for each primary VM instance 350P may further include an expected length of time to re-create (e.g., stock-out value) the corresponding primary VM instance. For example, a VM instance 350 may be associated with a stock-out value while the distributed system 200 waits for resources (i.e., processing resources and/or memory resources) become available for re-creating the VM instance 350. The MTTF and the expected length of time to re-create each primary VM instance 350P can be obtained through statistical analysis and/or machine learning techniques by observing execution of VM instances 350 having a same or similar VM type (i.e., processing resources, memory resources, storage resources, network configuration).

In some examples, all of the primary VM instances 350P in the pool of primary VM instances 350P include the same rate of unavailability. In other examples, the primary VM instances 350P associated with the type A VM type 380 include a rate of unavailability that is different than a rate of unavailability for the primary VM instances 350P associated with the type B VM type 380. As set forth in the remarks above, each primary VM instance 350P may include the corresponding MTTF value, indicating how long (e.g., a number of days) the primary VM instance 350P is expected to be operational before incurring a failure, and the stock-out value, indicating an expected length of time to re-create the primary VM instance 350P. The MTTF value and the stock-out value may be derived from observed monitoring data as well as machine learning algorithms that observe execution of similar VM instances 350 over time.

The VMM 320 may further maintain a service instance repository 324 indicating each individual service instance 362 of the software application 360 executing on a corresponding primary VM instance 350P of the pool of primary VM instances 350P and the target resource levels required for executing the corresponding individual service instance 362. The VMM 320 may further maintain in the service instance repository 324 an indication of the secondary jobs being run in each secondary VM instance 350S. In this regard, the VMM 320 may determine, upon failure of one or more of the primary VMs 350P, which jobs to evict from the secondary VMs 350S in order to run the instances from failed primary VM on the secondary VMs 350S. Such determination may be based on, for example, a priority value associated with the secondary jobs, an amount of space needed to run the primary instance failed over from the failed primary VM, an amount of time needed to evacuate particular secondary jobs, an amount of time the failed primary VM is expected to be unavailable, the VM type (e.g., A or B), or any of a variety of other factors.

In some examples, the VMM 320 includes a maintenance scheduler 326 that identifies maintenance time periods when one or more primary VM instances 350P in the pool of primary VM instances 350P will be unavailable for maintenance/updates performed off-line. For instance, the maintenance scheduler 326 may indicate a number of primary VM instances 350P that will be unavailable during a planned maintenance time period to perform maintenance/updates. In one example, the distributed system 200 periodically rolls out a kernel update at a two-percent (2%) deployment rate (or other percentage/value) such that two-percent of primary VM instances 350P in the pool of primary VM instances 350P will be unavailable during the planned maintenance time period to complete the update. A kernel update may include fixing security patches in a kernel 216 associated with the VM instance 350. In some examples, the VMM 320 receives a planned failover message 302 from a computing device 304 that indicates the number (or percentage) of primary VM instances 350P that will be unavailable during a planned maintenance time period to perform maintenance/updates. The computing device 304 may belong to an administrator of the distributed system 200. Optionally, the user device 120 may provide the planned failover message 302 via the external network 140 when the user 130 wants to update one or more primary VM instances 350P in the pool of primary VM instances 350P.

In some implementations, the pool of secondary VM instances 350S is per customer/user 130, rather than global, when the customer/user 130 deploys a large number of primary VM instances 350P and has specific networking or isolation requirements that prevents sharing of the pool of secondary VM instances 350S with other users/customers of the distributed system 200. In other implementations, the pool of secondary VM instances 350S is shared among all individual service instances 362 across all customers/users of the distributed system 200.

In some examples, the VMM 320 includes a secondary VM manager 328, which may determine how to allocate failed over instances from the primary VMs 350P to the secondary VMs 350S. For example, the secondary VM manager 328 may determine which jobs should be evicted from which secondary VMs 350S in order to make room for the failed over primary VM instances. As mentioned above, such determination may be based on, for example, a priority value associated with the secondary jobs, an amount of space needed to run the primary instance failed over from the failed primary VM, an amount of time needed to evacuate particular secondary jobs, an amount of time the failed primary VM is expected to be unavailable, the VM type (e.g., A or B), or any of a variety of other factors. The evicted secondary jobs may be temporarily ceased until the secondary pool resources are no longer needed by the failed over primary instances. For example, once the failed VM is back up and running the primary instance, the secondary VM may resume the previously evicted secondary jobs. In other examples, the secondary jobs may be gracefully shutdown and then killed after the grace period. For example, a job may receive a notification from the system that, it is going to be shutdown in X seconds, and may choose what it means for it to do graceful shutdown. For example, some applications may choose to flush state to a stable storage.

According to some implementations, evicting the secondary jobs includes gracefully dialing down and transferring computing resources from the secondary job to the failed or failing job in response to detecting a failover condition. For example, if a preemptible or secondary job is running in one of the secondary VMs 350S, the resources assigned to that secondary VM can be dynamically shifted from the secondary job to the primary or main job. Dynamic shifting or allocation of resources may include gradually reducing the resources being used by the secondary job while allocating the freed-up resources to the primary job. For example, the secondary resources may be allocated as they are freed. The freed-up resources may then run the primary job. Where the resource that is being dynamically allocated comprises a CPU, either the number of CPUs or performance of each CPU being used may be throttled to achieve a desired result. The dialing down and reallocation of computing resources may impact the performance of the secondary job, but at least provides an opportunity for it to gracefully shut down, while at the same avoid significantly impacting the performance of the primary job.

The dialing down and reallocation of computing resources may be set to occur during a pre-determined period, e.g., a so called "grace period." During this period, as the computing resources used by the secondary jobs are dialed down, they are allocated for use by the primary job. Once the grace period ends, the secondary job is terminated, e.g., the secondary job's container is torn down. During the grace period, the redistribution of computing resources between the secondary job and the primary job in effect comprises an inversely proportional relationship. That is, while computing resources used for a secondary job are dialed or ramped down, the primary job can begin with the resources made available to it and the resources made available to the primary job can be increased as they are freed up by the completion of the secondary job.

There are a number of different ways in which secondary jobs can gracefully ramp down and use less resources in proportion to primary failover jobs ramping up their resources. For example, an amount of input/output (I/O) for containers can be dynamically tuned. As such, secondary jobs may be allotted a predetermined amount of time, such as 10 s, 30 s, 2 minutes, etc., to wind down before being killed. The predetermined amount of time may be the same for all secondary jobs, or it may different based on the type of job, the resources allocated to the secondary job, an urgency of the failed primary job, or any other factors. During that predetermined amount of time, the primary job fails over to the resources that are freed by the secondary job. As another example, resources assigned to the secondary job may be decreased incrementally, such as every 5 s, 10 s, 30 s, or other interval of time. As these resources are incrementally freed, they may be allocated to the primary failover job that is ramping up. While these are a couple examples of how dynamic resource allocation may be performed, it should be understood that a number of other ways are possible.

The way in which dynamic resource allocation is performed may be based on, for example, the type of preemptible secondary job that is ramping down. For example, a secondary job that requires a lot of I/O can preliminarily reduce its CPU usage while maintaining a similar amount of I/O, and then later reduce its I/O. As another example, the dynamic resource allocation may be based on processing state of the secondary job at the time of failure of the primary job. For example, if the secondary job is only doing a small amount of computation, such as less than a particular predefined threshold, the job can be killed in a relatively short period of time. For example, the time allotted to the secondary job to ramp down before it is killed may be proportional to an amount of computation being performed by the secondary job.

According to some examples, rather than killing a secondary job after the graceful ramping down, the secondary job may remain running using less resources. For example, secondary jobs may specify a range of resources needed, such as a minimum number of CPUs, amount of memory, I/O, etc. on a lower end of the range, and a maximum desired number of resources on the higher end of the range. While the secondary job may be running using an amount of resources closer to the higher end of the range, when a failover of a primary instance occurs, the secondary job may ramp down. For example, some of the allocated resources may be freed for running the failover job, such that the secondary job is then running using an amount of resources closer to the lower end of the range.

There may be cases where the primary job could be started at the time the VM is created and use whatever resources are available at that time (e.g., a single virtual CPU ("vCPU")) and then those resources could be increased during the grace period at failover time. As an example, various primary jobs may be run on secondary VMs in what may be referred to as idle mode, where they don't serve traffic. A modest amount of resources, such as CPU, memory, network, may be allocated for these jobs as most of the resources will typically be allocated for the secondary jobs. In this example, when a VM running a primary job X fails, that primary job can quickly failover to the secondary VM, because it would not need to be moved. Rather, the idle mode of the primary job X would begin running.

According to some examples, the secondary VM manager 328 may include a plurality of separate managers that control different aspects of the secondary jobs. By way of example only, the secondary VM manager 328 may include a cluster resource manager that controls information on the secondary resources. Further, the secondary VM manager 328 may include a failover transition manager. When failure occurs, the failure transition manager may determine which node to failover to and orchestrate the transition. The secondary VM manager 328 may further include a preemptible job scheduler. For example, when a request to run a preemptible job is received, the preemptible job scheduler may figure out which resources are available in the secondary pool and allocated such resources to the request. While these other managers are described as possible sub-managers of the secondary VM manager 328, it should be understood that some or all of these other managers may be functions that are handled by the secondary VM manager 328 or by other managers, such as the primary CM manager 322, the maintenance scheduler 326, etc. In other examples, some or all of these other managers may be additional mangers within the VM manager 320.

In some scenarios, the VMM 320 (or a host machine 310) identifies unavailability of one of the primary VM instances 350P in the pool of primary VM instances 350P. For example, each primary VM instance 350P may employ an agent to collect an operational status 370 indicating whether or not the primary VM instance 350P is operating or is unavailable due to a failure. The host machines 310 may communicate the operational status 370 of VM instances 350 to the VMM 320, in addition to one another. As used herein, the term "agent" is a broad term, encompassing its plain and ordinary meaning, including, but not limited to, a portion of code that is deployed inside a VM instance 350 (as part of the guest OS 354 and/or as an application running on the guest OS 354) to identify the operational status 370 of the VM instance 350. Accordingly, the VMM 320 and/or the host machine 310 may receive the operational status 370 indicating unavailability of one of the primary VM instances 350, and cause the unavailable primary VM instance 350P to fail over to one of the secondary VM instances 350S to commence executing the individual service instance 362 associated with the unavailable primary VM instance 350P. In the example shown in FIG. 3, the operational status 370 indicates unavailability (e.g., due to failure) of one of the primary VM instances 350P executing on host machine 310*n*-1 and having VM type 380 of Type B, thereby causing the primary VM instance 350P to fail over to a secondary VM instance 350S having the VM type 380 of Type B' to commence executing the individual service instance 362 associated with the unavailable primary VM instance 350P having the VM type 380 of Type B.

The VM manager 320 may select which secondary jobs to pre-empt. Such selection may be performed in any of a variety of ways, based on any of a variety of factors. According to one example, the VM manger 320 may identify the node, such as the VM or bare metal, in the secondary pool that has the most resources available to it. For example, it may identify the node having the most CPU, the most memory, the most I/O, or any combination of these. In some examples, machine learning techniques may be used to predict which node will have the most available resources at a given point in time. For example, failures of primary instances may be tracked over time, along with the secondary jobs that were selected for pre-emption to free resources for the failover. Such information may be used to create a model for predicting when a particular primary instance will fail. The model may further predict which secondary job to pre-empt at that time, such as by determining which secondary nodes will have the most available resources at that time.

According to other examples, the secondary jobs to pre-empt may be selected based on location. For example, a global cloud provider may have multiple datacenters in different cities or countries around the world. A node in physical proximity to the failed node may be selected for handling the failover jobs, such that the failover jobs can be sent over a short physical distance and therefore may ramp up on the selected node more quickly.

According to yet another example, selection of which secondary jobs to pre-empt may be based on a type of application for the failover job and the type of hardware resources needed for that application. For example, some applications may require graphics processing units (GPUs), accelerators, etc. Accordingly, nodes having such hardware resources required by the failover application may be selected, and the secondary jobs running on such nodes may be pre-empted.

A software application (i.e., a software resource 110) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Non-transitory memory (e.g., memory hardware 114) may be physical devices used to store programs (e.g., sequences of instructions) or data (e.g., program state information) on a temporary or permanent basis for use by a computing device (e.g., data processing hardware 112). The non-transitory memory 114 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
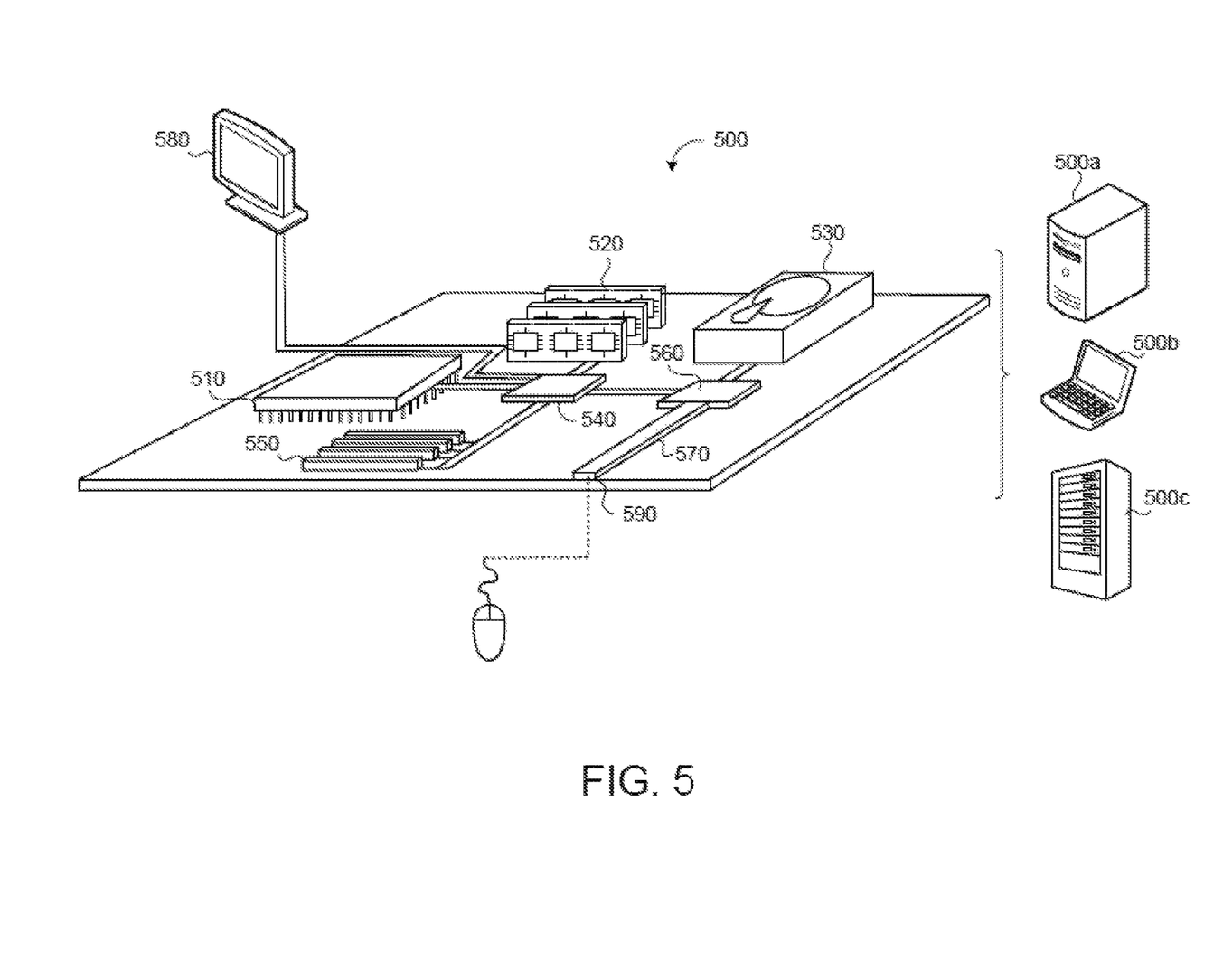
FIG. 5 is an example computing device according to aspects of the disclosure.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be examples only, and are not meant to limit implementations of the inventions described and/or claimed in this document. The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

By way of example only, the high speed controller 540 manages bandwidth-intensive operations for the computing device 500, while the low speed controller 560 manages lower bandwidth-intensive operations. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the scope of the disclosure. Accordingly, other implementations are within the scope of the following claims.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
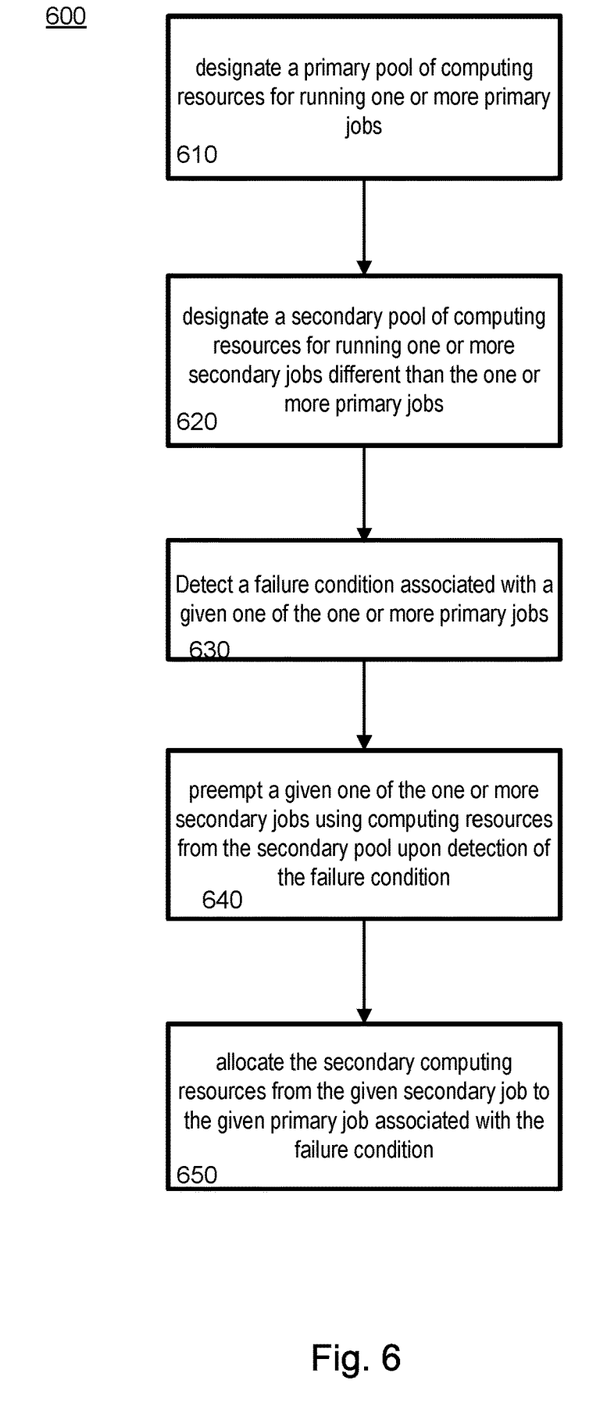
FIG. 6 is a flowchart of an example method of maintaining availability of virtual machine instances according to aspects of the disclosure.

FIG. 6 illustrates an example method 600 of running secondary jobs on secondary resources, where such resources are freed when needed to run a primary instance.

In block 610, a primary pool of computing resources is designated for running one or more primary jobs. The computing resources may include, for example, virtual machine, containers, servers, etc. The primary jobs may be related to a service performed for customers, for example, such as a MST service.

In block 620, a secondary pool of computing resources is designated for running one or more secondary jobs. The secondary jobs are different than the primary jobs, and lower priority than the primary jobs. For example, the secondary jobs may be assigned a lower priority value, and may relate to preemptible tasks where an interruption would be less detrimental than an interruption to the primary jobs. The secondary pool of computing resources may be the same type of resources as the primary pool, or it may be different. For example, the secondary resources may have different computing capacities, network capacities, etc. While in some examples the same number of secondary resources may be designated as a number of primary resources, in other examples the number of secondary resources may be different.

In block 630, a failure condition associated with a given one of the one or more primary jobs is detected. For example, the failure condition may be a planned outage, such as for a system update, or an unexpected failure.

In block 640, a given one of the one or more secondary jobs is preempted upon detection of the failure condition. For example, the secondary job may be paused and evicted from the secondary resources. Such secondary resources at this point have freed capacity for handling the one or more primary jobs.

In block 650, the primary jobs associated with the failure condition are allocated to the secondary resources. In this regard, the service of the primary jobs may be continued with minimal interruption. At the same time, however, backup resources are not idle.

According to some examples, the evicted secondary job may be restored to the secondary resource when the primary resource is restored and the primary jobs are restored on the primary resource. According to other examples, the secondary job may be terminated after a period of time.

This technology allows for efficient allocation of computing resources, such as VMs, which creates operational efficiencies and reduces operation costs. For example, rather than having a pool of computing resources sit idle, this technology allows those resources to be used for secondary jobs which would otherwise create demand for computing and network resources. In that regard, the use of otherwise idle resources increases the operational efficiency of the network and computing environment. The foregoing techniques may be particularly advantageous in MST services, where multiple users (tenants) each have their own database, and each database has multiple applications running for that particular user. However, it should be understood that the features described above may be applied in other type of service architectures as well.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A method for managing pooled computing resources used for providing services in a distributed system, comprising:
    running an individual service instance in an isolated environment within a primary pool of computing resources;
    running one or more secondary jobs different than the individual service instance on a secondary pool of computing resources;
    detecting a failure condition associated with the isolated environment;
    selecting one or more of the one or more secondary jobs to preempt, the one or more secondary jobs comprising preemptible jobs each having a lower priority than the individual service instance; and
    freeing computing resources in the secondary pool by reducing the computing resources allocated to the selected one or more secondary jobs, while allocating the freed computing resources to the individual service instance of the isolated environment with the failure condition, wherein the freeing is performed in proportion to the allocating of the freed computing resources.

2. The method of claim 1, further comprising determining a threshold for a number of secondary jobs to be supported based on a run time of the one or more secondary jobs and a number of instantiated service instances.

3. The method of claim 2, further comprising:
    receiving requests for additional secondary jobs; and
    launching the additional secondary jobs in the secondary pool of computing resources until a maximum threshold in utilized resources is consumed.

4. The method of claim 1, wherein freeing the computing resources comprises reducing central processing unit (CPU) resources, memory or network resources.

5. The method of claim 4, wherein reducing CPU resources comprises reducing a number of CPUs, reducing a number of CPU cores, or reducing a performance metric of one or more CPUs.

6. The method of claim 1, wherein the isolated environment comprises a virtual machine.

7. The method of claim 1, further comprising terminating a given secondary job of the selected one or more secondary jobs after a predetermined time period.

8. The method of claim 7, further comprising allocating all the computing resources in the secondary pool used by the given secondary job to the individual service instance.

9. The method of claim 1, wherein selecting one or more of the secondary jobs to preempt is based on a priority of the secondary jobs.

10. The method of claim 1, wherein selecting one or more of the one or more secondary jobs to preempt is based on an expected amount of time needed to shut down the secondary job.

11. A system for managing pooled computing resources used for providing services in a distributed system, comprising:
    a primary pool of computing resources designated for running an individual service instance in an isolated environment;
    a secondary pool of computing resources designated for running one or more secondary jobs different than the individual service instance; and
    one or more processors configured to:
        detect a failure condition associated with the isolated environment;
        select at least one of the one or more secondary jobs to preempt, the one or more secondary jobs comprising preemptible jobs each having a lower priority than the individual service instance;
        free computing resources in the secondary pool by reducing the computing resources allocated to the selected at least one secondary job; and
        dynamically allocate the freed resources to the individual service instances of the isolated environment with the failure condition;
        wherein the computing resources in the secondary pool are freed in proportion to the dynamically allocated freed computing resources.

12. The system of claim 11, wherein the one or more processors are further configured to:
    receive requests for additional secondary jobs; and
    launch the additional secondary jobs in the secondary pool of computing resources until a maximum threshold in utilized resources is consumed.

13. The system of claim 11, wherein freeing the computing resources comprises reducing central processing unit (CPU) resources, memory or network resources.

14. The system of claim 13, wherein reducing CPU resources comprises reducing a number of CPUs, reducing a number of CPU cores, or reducing a performance metric of one or more CPUs.

15. The system of claim 11, wherein the isolated environment comprises a virtual machine.

16. The system of claim 11, wherein the failure condition comprises a planned system update.

17. The system of claim 11, wherein the processor is configured to select one or more of the secondary jobs to preempt is based on at least one of a priority of the secondary jobs or an expected amount of time needed to shut down the secondary job.

18. A non-transitory computer-readable medium storing instructions executable by one or more processors for performing a method of managing pooled computing resources used for providing services in a distributed system, the method comprising:
    determining a primary pool of computing resources designated for running an individual service instance within an isolated environment;
    determining a secondary pool of computing resources designated for running one or more secondary jobs different than the individual service instance, the one or more secondary jobs comprising preemptible jobs each having a lower priority than the individual service instance;
    detecting a failure condition associated with the isolated environment;
    selecting at least one of the one or more secondary jobs to preempt; and
    freeing the computing resources in the secondary pool by reducing the computing resources allocated to the selected at least one secondary job, while dynamically allocating the freed computing resources to the individual service instance of the isolated environment with the failure condition, wherein the freeing is performed in proportion to the dynamically allocating of the freed computing resources.

* * * * *